United States Patent

Hogan et al.

Patent Number: 5,871,871
Date of Patent: Feb. 16, 1999

[54] STABILIZED MULTI-LAYERED STRUCTURE OF COLOR FILTERS ON A SILICON CHIP AND A METHOD FOR MAKING

[75] Inventors: Dennis Pfleegor Hogan, Jericho; Robert Kenneth Leidy, Burlington; Harold George Linde, Richmond, all of Vt.

[73] Assignee: International Business Machines Corporation, Armonk, N.Y.

[21] Appl. No.: 717,340

[22] Filed: Sep. 20, 1996

[51] Int. Cl.$^6$ .............................. G02B 5/20; H01L 31/00; H04N 9/083

[52] U.S. Cl. .............................. 430/7; 430/321; 257/440; 348/273

[58] Field of Search .................. 430/7, 321; 349/106; 257/440; 348/273

[56] References Cited

U.S. PATENT DOCUMENTS

| | | |
|---|---|---|
| 4,339,514 | 7/1982 | Biber . |
| 4,450,215 | 5/1984 | Reithel et al. .............................. 430/7 |
| 4,541,010 | 9/1985 | Alston . |
| 4,555,731 | 11/1985 | Zinchuk . |
| 4,613,398 | 9/1986 | Chiong et al. . |
| 4,641,185 | 2/1987 | Alston et al. . |
| 4,786,964 | 11/1988 | Plummer et al. . |
| 4,808,501 | 2/1989 | Chiulli . |
| 4,867,838 | 9/1989 | Brooks et al. . |
| 4,902,610 | 2/1990 | Shipley . |
| 5,049,404 | 9/1991 | Kisler et al. . |
| 5,075,770 | 12/1991 | Smyth . |
| 5,312,717 | 5/1994 | Sachdev et al. . |
| 5,320,934 | 6/1994 | Misium et al. . |
| 5,443,931 | 8/1995 | Watanabe . |
| 5,633,739 | 5/1997 | Matsuyama et al. .................... 349/106 |
| 5,641,594 | 6/1997 | Kudo et al. ................................. 430/7 |
| 5,667,920 | 9/1997 | Chiulli et al. ............................... 430/7 |

FOREIGN PATENT DOCUMENTS 1-215869  8/1989  Japan .

OTHER PUBLICATIONS

Research Disclosure/Mar. 1987/No. 275/Kenneth Mason Publications Ltd/ England/Multi–Level Chip Carrier Using Silylated Photoresist as Dielectric.

Burlington This Week/IBM Microelectronics Division/Extension 6–7858/vol. 3/No. 15/Apr. 15, 1996/IBM Burlington Teams with Polaroid on High–Tech Chip.

*Primary Examiner*—John A. McPherson
*Attorney, Agent, or Firm*—Schmeiser, Olsen & Watts

[57] ABSTRACT

There is provided, a stabilized multi-layered colored filter structure useful in a digital color camera and method for making same. The method involves effecting reaction between a polyfunctional organosilicon material, such as a hexaorganosilazane with at least one phenolic resist containing an organic dye color forming filter, in a multi-layered structure of color filters on a silicon chip.

17 Claims, 1 Drawing Sheet

STABILIZED MULTI-LAYERED STRUCTURE OF COLOR FILTERS ON A SILICON CHIP AND A METHOD FOR MAKING

BACKGROUND OF THE INVENTION

1. Field of the Invention

The present invention relates to a method for making a stabilized color filter. The stabilized color filter can be used to capture or display an image in color and can be used for image capture in a color digital camera when employed in combination with a charge coupled device (CCD). More particularly, the present invention relates to a stabilized color filter, and its stepwise fabrication. The stabilized color filter comprises an electroactive substrate, such as a silicon substrate, and dye loaded phenolic resist layers which respectively are capable of filtering light to provide light having a first predetermined wave length, light having a second predetermined wave length, and light having a third predetermined wave length. In addition, where at least one of the dye loaded phenolic resist layers is a cross-linked silylated phenolic resist layer which has been found to provide enhanced resistance to interlayer penetration.

2. Description of the Prior Art

Digital cameras having color capability have been developed which employ a charge couple device (CCD), and a multilayered silicon chip containing photosensitive elements, as the film; the CCD transforms light into electrical charges which can then be digitized by the camera's electronics. A color filter can be used in combination with the CCD. The color filter can be used to capture an image by separating the transmitted, or reflected light, into its component colors and storing them in adjoining pixels on an electroactive silicon substrate. Transfer of the image is achieved by transforming light into electrical charges which are moved out of the array by the CCD and digitized by the camera's electronics.

During the fabrication of the color filter, resists can be applied in a stepwise manner onto a silicon wafer. For example, a photo resist containing a red dye component can be spun onto a silicon wafer and thereafter exposed, developed, and baked. Similarly, resists containing a blue dye and a green dye can be respectively applied to the silicon chip.

Experience has shown that unless proper procedures are utilized, intermixing of the dye loaded contiguous resist layers of the color filter can occur which can adversely impact their optical properties. One solution is to employ resists having certain organic solvents, for example diglyme, or cellosolve acetates, which have been found to substantially reduce or avoid inter-resist-layer overlap. However, use of such solvent's has been discontinued because they are classified as being "environmentally unsafe".

It would be desirable therefor to provide an environmentally safe method for making a multilayered color filter containing photosensitive elements which could be used as an image sensor, or in projection display applications.

SUMMARY OF THE INVENTION

The present invention is based on the discovery that a multi-layer color filter, which can be advantageously employed as an image sensor in a high resolution digital color camera, or in a display application, can be made without the use of toxicologically unsafe solvents. It has been found that improved stability between respective resist layers can be achieved with environmentally "safe solvents", such as propylene glycol monomethyl ether acetate. A stabilized multi-layer color filter can be made providing at least one color filter bearing photo resist layer, for example a phenolic resist having an appropriate organic dye, is silylated with a polyfunctional organosilicon material, such as hexaorganocyclosilazane, to form a cross-linked resist layer, which is transparent to light in the visible spectrum. Surprisingly, silylation of at least one of the phenolic resist layers with such polyfunctional organosilicon material has been found to improve resistance 15 to interlayer penetration. A cross-linked layer results which can be retained as a permanent layer in the multilayered colored filter structure, if desired.

For example, a silicon chip can be initially coated with a resist having an organic dye suitable as a red filter, followed by the application of a resist having an organic dye suitable as a blue filter. If the applied blue resist is silylated with an organocyclotrisilazane, such as hexamethylcyclotrisilazane, the subsequent application of a resist having a green filter can be accomplished using an environmentally safe solvent, and inter-mixing between the applied color filter layers is substantially minimized.

As used hereinafter the expression "environmentally safe organic solvent" and environmentally unsafe "organic solvent" are consistent with usage standards for manufacturing shown in the regulations of the Department Of Environmental Conservation (DEC) of New York State, or the regulations of the Environmental Protective Agency (EPA) of the federal government. As used hereinafter, the term "resist" or "photo resist" is used sometimes which will mean a phenolic resin, such as a novolac resin which may have one or more additives, such as photo active compounds, dyes, curing catalysts, etc. As used hereinafter, the term silylation means treatment of a phenolic resin with a polyfunctional organosilicon material such as an organocyclosilazane, for example hexamethylcyclotrisilazane, at a temperature of −20° C. to +150° C. for a period of 0.1 to 60 minutes, and preferably 1 to 5 minutes.

Although the reason why silylation achieves such valuable results is not completely understood, one possible explanation is that the difunctional organosilicon units generated from the cyclic silazane react with the phenolic resist and a protective cross linked structure is formed which minimizes diffusion between contiguous resist layers.

There is provided by the present invention, a photo chromatic filtering system comprising:

an electroactive substrate; and a multi-layered structure of contiguous light filters respectively positioned on at least a portion of the electroactive substrate, where each light filter comprises a phenolic resin and can respectively filter light having a first predetermined wavelength, a second predetermined wavelength, and a third predetermined wavelength, and where at least one of the contiguous light filters has been reacted with a polyfunctional organosilicon material to produce a transparent cross-linked phenolic light filter which is retained as a stabilizing layer.

In a further aspect of the present invention, there is provided a method for making a stabilized multi-layered structure of color filters on a silicon chip useful in a color digital camera as an image sensor when employed with a CCD, which method is practiced in an environmentally safe manner as a result of the substantial exclusion during processing of environmentally unsafe organic solvents, which stabilized multi-layered structure of color filters result from the application and processing of phenolic resists where each phenolic resist respectively contains an organic dye which allows the transmission of light corresponding respectively to light having a first predetermined wavelength, light having a second predetermined wavelength, and light having a third predetermined wavelength, which method comprises the steps of, (1)
  (a) initially exposing the surface of the silicon chip with an organodisilazane to render it hydrophobic,
  (b) applying a phenolic resist having an organic dye for filtering light having a first predetermined wavelength onto the surface of treated silicon wafer and thereafter patterning and baking the applied resist, (2)
  (c) exposing the surface of the treated silicon chip with an organodisilazane to render it hydrophobic,
  (d) applying a resist having an organic dye for filtering light having a second predetermined wavelength to the treated silicon wafer, exposing the applied resist to pattern it, and thereafter developing and baking the patterned resist,
  (e) treating the surface of the patterned resist with a polyfunctional organosilicon material, and
  (f) thereafter rinsing the treated silicon wafer with an organic solvent followed by baking, (3)
  (g) applying a resist having an organic dye for filtering light having a third predetermined wavelength onto the resulting silicon wafer,
  (h) and thereafter, exposing, developing and baking the resulting treated silicon wafer.

In an additional aspect of the present invention, there is provided a color digital camera having an image sensing means comprising an electroactive substrate which adjoins a color filter, where the color filter comprises a multi-layered structure of contiguous phenolic resist layers, where each of the respective phenolic resist layers has an organic dye to allow light transmission of different predetermined wavelengths, and at least one color resist phenolic layers has been reacted with a polyfunctional organosilicon material to form a transparent cross-linked reaction product which is retained as a stabilizing layer.

DESCRIPTION OF THE PREFERRED EMBODIMENTS

Figure 1:
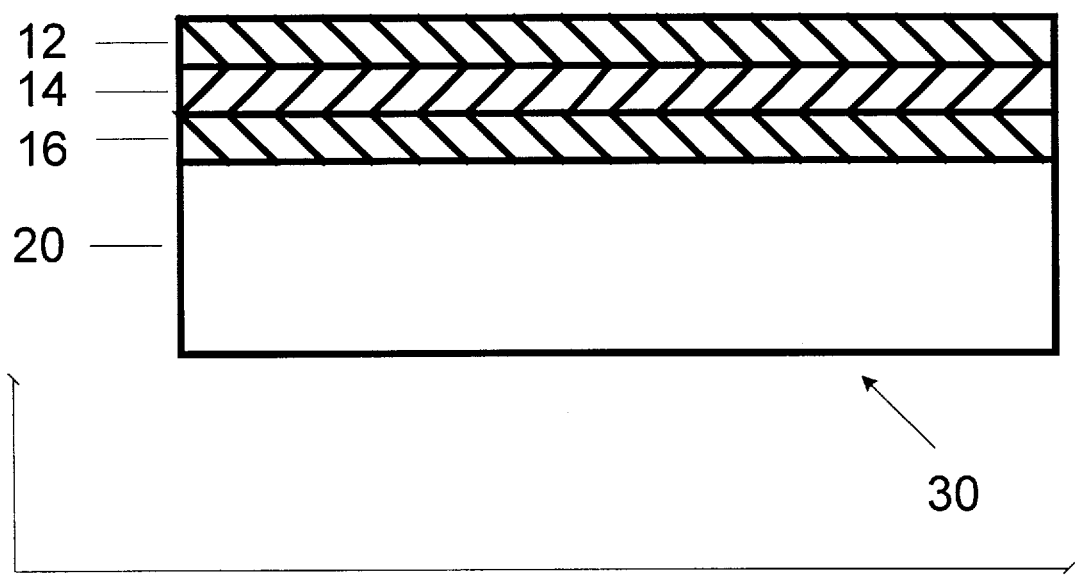
FIG. 1 shows a digital color camera of the present invention.

Referring to FIG. 1, a digital color camera 10 is shown containing a semiconductor chip 30. The semiconductor chip includes a first dye containing resist which acts as a red filter 16, a second dye containing resist which acts as a blue filter 14, a third dye containing resist which acts as a green filter 12, and an electroactive substrate layer 20.

In the practice of the method and apparatus of this invention, a silicon wafer 20 is pretreated with a hexaorganodisilazane, such as hexamethyldisilazane and thereafter a phenolic resist is spun onto the silicon wafer 20.

Hexaorganodisilazane pretreatment has been found to render the surface of the silicon wafer hydrophobic. Suitable silicon wafers have an average diameter of 30 mm to 300 mm and a thickness of 100 $\mu$m to 1000 $\mu$m. Suitable resists are phenolic resins having free OH radicals and preferably novolac resins. The resists can be spun onto the silicon substrate, or to a previously applied resist substrate to a thickness of 0.5 $\mu$m to 5 $\mu$m. Environmentally acceptable solvents which can be used for resist applications are for example propylene glycol monomethy ether acetate, ethyl lactate etc.

The silazane treated wafer can then be treated with a phenolic resist having about 0.01% to about 10% by weight of a suitable organic dye which can serve to filter light having a predetermined wave length. Suitable red dyes are for example Sudan Red 7b, Solvent Red 49. Suitable blue dyes are for example Acid Blue 25, 29, 40, 92, and 113. Green dyes such as Acid Green 25, 27, and 3 also can be used.

Although the order by which the particular dye is applied is not critical, one procedure is to apply the red dye initially after the silicon substrate has been rendered hydrophobic as described above. The first resist 16, such as a resist containing a red dye can be spun onto the treated silicon wafer, and thereafter exposed, developed and baked in a conventional manner. Exposure can be accomplished using a Perkin Elmer 500 for 200 mjs to 1500 mjs. Development can be done in a conventional basic developer such as 0.26N TMAH using a Material Technology Inc. (MTI), spray. Baking can be done in a Heraus oven of the Heraus Company(Germany).

The procedure described above for rendering the substrate hydrophobic can be repeated, and a phenolic resist 14 loaded with second dye, such as a blue dye, can be spun onto the hydrophobic silicon wafer. The resulting resist 14 is thereafter exposed and developed.

The blue dye resist 14 can then be subjected to treatment with an organic solvent solution of an organocyclosilazane, such as a solution in a suitable hydrocarbon solvent, for example, xylene. The resulting treated wafer can then be further washed in organic solvent and thereafter baked.

Following the above procedure, application of a third dye containing resist 12, such as a green dye resist 12, can be accomplished directly without resort to pretreatment with a hexaorganodisilazane to render the substrate hydrophobic. One possible explanation is that silylation of the second dyed resist 14 with the hexaorganocyclotrisilazane crosslinks with the phenolic resist and renders the substrate sufficiently hydrophobic. The third dye containing resist 12 can then be processed in a similar manner as previously described. However, a longer exposure may be necessary to achieve optimum results.

In addition to hexaorganocyclotrisilazane, such as hexamethylcyclotrisilazane, other cyclic silazanes can be used, where the organo substitution can be selected from $C_{(1-8)}$ alkyl radicals, or mixtures thereof, and $C_{(6-3)}$ aryl radicals, such as phenyl. Other reactive polyfunctional organosilicon materials also can be used, such as diorganosilanes, for example, dimethyldichlorosilane.

In order that those skilled in the art will be better able to practice the present invention, the following example is given by way of illustration and not by way of limitation. All parts are by weight unless otherwise indicated.

EXAMPLE

A 200 mm×silicon wafer is immersed for 2 minutes in a vapor atmosphere of hexamethyldisilazane. There is then spun onto the resulting hydrophobic wafer at 3400 rpms to a thickness of 2.0 $\mu$m using an MTI tool, a novolac resist containing up to 10% by weight of a red dye suitable as a color filter. The resist is then exposed for 400 mjs/UV4/ap3 using a Perkin Elmer 500. After being developed in a 0.1M sodium silicate solution with post develop, acetic acid rinse using an MTI spray, the applied resist is baked in a Heraus oven at 145° C. for 2 hours.

The treated wafer is then subjected to a hexamethyldisilazane vapor for two minutes as described above. There is then applied using the MTI system, a novolac resist to a thickness of 2.06 µm which contains about 5% by weight of a blue dye suitable as a filter. The resulting applied resist is then subjected to TEGAL oxidative etching to effect the removal of about 600 Å of surface. The resist is then exposed for 450 mjs/UV4/ap3 using the Perkin Elmer 500 system described above. The resist is then developed as previously described using a 120 second exposure in sodium silicate solution.

The treated silicon wafer is immersed for 4 minutes in a 10% xylene solution of hexamethylcyclotrisilazane at 50° C. The silylated silicon wafer is then rinsed in xylene for 4 minutes. The treated silicon wafer is then baked for 5 hours in a Heraus oven at 145° C.

There is then applied to the treated silicon wafer 20 using the above MTI tool at 4500 rpms, 1.751 µm of a novolac resist containing about 5% by weight of a green dye suitable as a green light filter. The resulting treated silicon wafer 20 is then exposed for 1100 mjs/UV4/ap3 using the above described Perkin Elmer 500 system. The resulting treated silicon wafer 20 is then developed and baked as described above. Based on method of preparation, there is obtained a pattern of colored filters useful in a CCD color digital camera.

What is claimed is:

1. A photo chromatic filtering system comprising:
   an electroactive substrate; and
   a multi-layered structure of contiguous light filters respectively positioned on at least a portion of the electroactive substrate, wherein each light filter includes a phenolic resin and can respectively filter light having a first predetermined wavelength, a second predetermined wavelength, and a third predetermined wavelength, and wherein at least one of the contiguous light filters has been patterned, reacted with a polyfunctional organosilicon material, and hard baked such that the reacted light filter is of itself a transparent cross-linked stabilizing layer.

2. A photo chromatic filtering system in accordance with claim 1, wherein the polyfunctional organosilicon material is a hexaorganocyclosilazane.

3. A digital color camera using the photochromatic filtering system of claim 1 as an image sensor.

4. A photo chromatic filtering system comprising:
   an electroactive substrate;
   a first stable transparent resin permanently formed on a portion of said substrate to filter light having a first predetermined wavelength;
   a second stable transparent resin permanently formed on a portion of said substrate and a portion of said first stable transparent resin to filter light having a second predetermined wavelength; and
   a third stable transparent resin permanently formed on a portion of said substrate and a portion of said first stable transparent resin and a portion of said second transparent resin to filter light having a third predetermined wavelength, wherein at least one of the transparent resins was patterned, reacted with a polyfunctional organosilicon material, and hard baked such that the reacted resin is of itself a cross-linked stabilizing layer to render each transparent resin a stable transparent resin.

5. A digital color camera having a charge-coupled device and a color filter exhibiting improved stability, which color filter comprises an electroactive silicon chip having solvent coated multi-contiguous color resist layers, wherein at least one of the solvent coated color resist layers had been patterned, reacted with a polyfunctional organosilicon material, and hard baked such that the reacted color resist layer is of itself a transparent stabilizing layer.

6. A method for making a stabilized multi-layered structure of color filters on a silicon substrate comprising the steps of:
   (1) (a) initially exposing a surface of the silicon substrate with an organodisilazane to render it hydrophobic,
   (b) applying a phenolic resist having a first color filter onto the surface of the silicon substrate and thereafter patterning and baking the applied phenolic resist;
   (2) (c) exposing the surface of the treated silicon substrate with an organodisilazane to render it hydrophobic;
   (d) applying a resist having a second color filter onto the treated silicon substrate, exposing the applied resist to pattern it, and thereafter developing the patterned resist,
   (e) treating the surface of the patterned resist with a hexaorganocyclotrisilazane, and
   (f) thereafter rinsing the treated silicon substrate with an organic resist solvent followed by baking,
   (3) (g) applying a resist having a third color filter onto the resulting treated silicon substrate,
   (h) and thereafter, exposing, developing and baking the applied resist.

7. A method of making a stabilized multi-layered structure of colored filters on a silicon substrate in accordance with claim 6, wherein the first color filter is a red color filter.

8. A method for making a stabilized multi-layered structure of colored filters on a silicon substrate in accordance with claim 6, wherein the second color filter is a blue color filter.

9. A method for making a stabilized multi-layered structure for colored filters on a silicon substrate in accordance with claim 6, wherein the third color filter is a green color filter.

10. A method in accordance with claim 6, wherein the phenolic resist is a novolac.

11. A method in accordance with claim 6, wherein the organodisilazane is hexamethyldisilazane.

12. A method in accordance with claim 6, wherein the hexaorganocyclotrisilazane is hexamethylcyclotrisilazane.

13. A method in accordance with claim 6, wherein propylene glycol monomethyl ether acetate is used as the resist solvent.

14. A method in accordance with claim 6, wherein only the second color filter is of itself a cross-linked stabilizing layer.

15. A method in accordance with claim 6, wherein the multi-layered structure of color filters on a silicon substrate is useful in a color digital camera as an image sensor when rendered electroactive, the method is practiced in an environmentally safe manner as a result of the substantial exclusion during processing of environmentally unsafe organic solvents, and the color filters result from the application and processing of phenolic resists each containing an organic dye respectively corresponding to a color filter.

16. A method in accordance with claim 6, wherein the baking occurs at a temperature of approximately 145° C. for approximately 2 to 5 hours.

17. A method in accordance with claim 6, wherein only the second color filter and one of either the first or third color filter are of themselves a cross-linked stabilizing layer.

* * * * *